(12) United States Patent
Bohm et al.

(10) Patent No.: US 7,641,134 B2
(45) Date of Patent: Jan. 5, 2010

(54) METHOD FOR ISOLATING ALEURONE PARTICLES

(75) Inventors: Arturo Bohm, Oberuzwil (CH); Andreas Kratzer, Zurich (CH)

(73) Assignee: Buehler AG, Uzwil (CH)

( * ) Notice: Subject to any disclaimer, the term of this patent is extended or adjusted under 35 U.S.C. 154(b) by 0 days.

(21) Appl. No.: 12/143,109

(22) Filed: Jun. 20, 2008

(65) Prior Publication Data
US 2008/0257787 A1 Oct. 23, 2008

Related U.S. Application Data

(62) Division of application No. 10/494,847, filed as application No. PCT/CH02/00547 on Oct. 2, 2002, now Pat. No. 7,431,228.

(30) Foreign Application Priority Data
Nov. 8, 2001 (DE) ................. 101 54 462

(51) Int. Cl.
*B02C 23/08* (2006.01)
(52) U.S. Cl. ...................... 241/79.2; 241/81
(58) Field of Classification Search ........ 241/79.1, 241/79.2, 79, 81; 209/127.1, 128, 127.2, 209/127.4, 127.3
See application file for complete search history.

(56) References Cited

U.S. PATENT DOCUMENTS

| 668,791 | A | | 2/1901 | Blake et al. |
| 668,792 | A | | 2/1901 | Blake et al. |
| 701,417 | A | | 6/1902 | Blake et al. |
| 959,646 | A | | 5/1910 | Swart |
| 2,135,716 | A | | 11/1938 | Johnson |
| 2,154,682 | A | | 4/1939 | Johnson |
| 2,180,804 | A | | 11/1939 | Fahrenwald et al. |
| 2,803,344 | A | * | 8/1957 | Morrison .............. 209/127.4 |
| 3,477,568 | A | | 11/1969 | Madrid |
| 5,746,320 | A | * | 5/1998 | Fujita et al. ........... 209/127.3 |
| 5,885,330 | A | * | 3/1999 | Lee ......................... 95/69 |

FOREIGN PATENT DOCUMENTS

| EP | 0 980 713 | 2/2000 |
| WO | WO 85/04349 | 10/1985 |

* cited by examiner

*Primary Examiner*—Bena Miller
(74) *Attorney, Agent, or Firm*—Reed Smith LLP

(57) ABSTRACT

The invention relates to a method and device for separating a mixture made of particles of a first particle type and a second particle type, especially aleurone particles and shell particles made of comminuted bran, said particles being scarcely distinguishable in terms of size and density, into various types of particles. Separation occurs according to particle-type specific triboelectric charging of said particles in a first active area and subsequent separation of the differently charged moving particles in an electric field.

9 Claims, 2 Drawing Sheets

METHOD FOR ISOLATING ALEURONE PARTICLES

CROSS-REFERENCE TO RELATED APPLICATIONS

This is a divisional application of Ser. No. 10/494,847, filed Dec. 3, 2004 now U.S. Pat. No. 7,431,228, claims priority of International Application No. PCT/CH02/00547, filed Oct. 2, 2002 and German Application No. 101 54 462.6, filed Nov. 8, 2001, the complete disclosures of which are hereby incorporated by reference.

BACKGROUND OF THE INVENTION a) Field of the Invention

The invention relates to a method and a device for separating the various sorts of particles in a mixture comprised of particles produced by comminuting the grains of cereal grains, in particular wheat, and are present as a mixture consisting of at least first and second sort of particle. In addition, the invention relates to a product which is also obtained via the method and device according to the invention.

b) Description of the Related Art

WO 85/04349 describes a method for obtaining aleurone cell particles from wheat grain. In this case, the grain particles are comminuted in a hammer mill in a first step, so that aleurone cell particles and shell particles are present as a mixture. This mixture is given an electrical charge through exposure to frictional electricity in a second step, wherein the aleurone cell particles and the shell particles receive different electrostatic charges. In a third step, the mixture with the differently charged particles is moved through an electrical field, so that the differently charged particles are varyingly deflected, wherein the shell particles and aleurone cell particles are caught in separate containers. The frictional electric charge (step 2) takes place in a stream of dry air, into which the mixture is introduced, and which moves in a hollow column. In this case, obviously turbulent air streams arise in the column ("elutriator"), wherein the particles in the mixture rub against both each other and the interior wall of the elutriator, thereby receiving the respective electrostatic charge.

In this method of prior art, however, large quantities of air had to be moved. Nonetheless, no intensive frictional electric interaction takes place between the particles and the interior elutriator walls.

OBJECT AND SUMMARY OF THE INVENTION

Therefore, the primary object of the invention is to separate a mixture comprised of various sorts of particles, in particular aleurone and shell particles from comminuted grain, which hardly differ in terms of size and density, into its various sorts of particles more efficiently than in prior art.

This object is achieved by a method in which:

(a) The particles of the first particle sort and second particle sort in the mixture are moved along at least one surface of at least one solid material in a first impact area in such a way as that at least one portion of their particle surface is at least sectionally in contact with the solid material surface as they move along the at least one solid material surface, as a result of which the particles of the first particle sort and the particles of the second particle sort become electrically charged in such a way that the electrical charge of the particles of the first particle sort differs from the electrical charge of the particles of the second particle sort enough to enable an electrostatic separation of particles of the first particle sort from particles of the second particle sort;

b) in a second impact area, the particles of the first particle sort and second particle sort with the sufficiently different electrical charges are subsequently moved into an electrical field between a first electrode area and a second electrode area, between which there is an electrical potential difference, at essentially the same velocity, as a result of which the particles of the first particle sort and second particle sort with the sufficiently different electrical charges move along sufficiently different paths as they travel through the electrical field; and c) the particles of the first particle sort and the particles of the second particle sort are caught at a first location and at a second location at the end of their journey through the electrical field, characterized in that the at least one surface of the at least one solid material is concave in the first impact area, and that the particles of the first sort and particles of the second sort in the mixture moving along the concave surface are pressed against the concave surface of the solid material as a result of their centrifugal force as they move inside the first impact area.

The particles can be gathered at this first and second location, and removed after enough have accumulated. As an alternative, they can also be continuously, e.g., pneumatically, conveyed further in step c) after separation in step b), and then be routed to a packaging system, for example.

In particular, the particles of the first particle sort are aleurone particles, and the particles of the second particle sort are residual particles from which aleurone has been removed, in particular shell particles, of the comminuted grain.

The object according to the invention is also achieved with a the device according to the invention, with:

a) a first impact area with at least one surface of at least one solid material, along which the particles of the first particle sort and the second particle sort of the mixture can move in such a way that at least one portion of their particle surface is at least sectionally in contact with the solid material surface as they move along the at least one solid material surface; and b) a second impact area subsequent to the first impact area, with a first electrode area and a second electrode area, between which an electrical voltage can be applied; and with a first accumulation area for particles of the first sort and an accumulation area for particles of the second sort separate from the first accumulation area, characterized in that the at least one surface of the at least one solid material is concave in the first impact area, so that the particles of the first sort and second sort that can move along the concave surface are pressed against the concave surface of the solid material as a result of their centrifugal force as they move inside the first impact area.

In particular, the at least one surface of the at least one solid material is concave in the first impact area, so that the particles of the first sort and second sort that can move along the concave surface are pressed against the concave surface of the solid material as a result of their centrifugal force as they move inside the first impact area.

The product according to the invention, in particular aleurone particles, which was obtained by separating the various particle sorts of the mixture through the use of steps a), b) and c) of the aforementioned method, has a high level of purity.

It is preferably obtained through the repeated application of steps a), b) and c).

Additional advantages, features and possible applications of the invention the following description of two exemplary embodiments of the invention based on the drawing.

DESCRIPTION OF THE PREFERRED EMBODIMENTS

Figure 1:
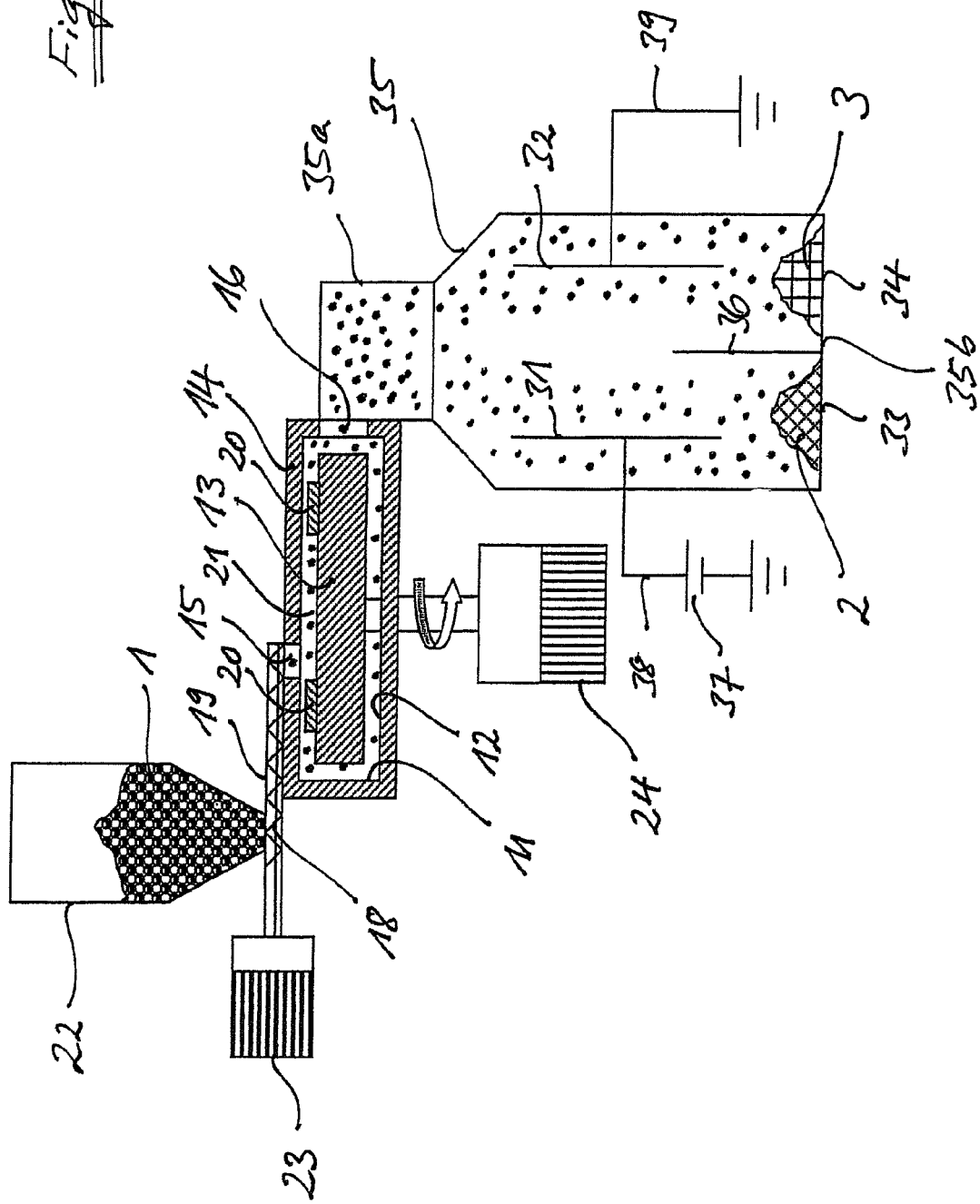
FIG. 1 shows a first exemplary embodiment of the invention.

The first device according to the invention as shown on FIG. 1 comprises a supply vessel 22 in which the mixture 1 to be separated, which contains at least a first particle sort 2 and a second particle sort 3, is routed to the first impact area 13, 14, in which particles 2, 3 of mixture 1 are given an electrical charge varying by particle sort before the particles 2, 3 carrying different electric charges are supplied to the second treatment area 31, 32, 35, where they accumulate at different locations 33, 34 in a separation vessel 35, sorted according to type of particle based on their electric charge.

Through the force of gravity, the mixture 1 goes out of the feed vessel 22, which tapers toward the bottom, into a conveyor device 18, 19 consisting of a conveyor screw 18 and into a conveyor channel 19. The conveyor screw 18, which is driven by a drive motor 23, conveys the mixture 1 through a product inlet 15 into a housing 14, where a rotor element 13 is rotatably mounted.

There is a gap area 21 between the rotor element 13, which is driven by a drive motor 24, and the housing 14, such that the mixture 1, which is supplied through the product inlet 15 and strikes the rotor element 13, is accelerated both radially and tangentially through this gap area due to friction at the surface of the rotor element. The mixture 1 accelerated in this way passes through the gap area 21 and obliquely strikes the surface 11 of the inside wall of the housing, which has a concave curvature. Due to its own inertia (centrifugal force) and due to constantly resupplied mixture, the mixture 1 is pressed against the surface 11 having a concave curvature and is conveyed along this surface until it comes out of the housing 14 through the product outlet 16 and enters a separation vessel 35.

The disk-shaped rotor element 13 has elevations 20, which are situated on its disk surface facing the product inlet 15. In addition to the above-mentioned friction on the surface of the rotor element 13 ("baffle disk"), these elevations 20 also contribute toward the acceleration of the mixture 1 and the ever-present air through the gap area 21, and on the other hand, they also exert an impact effect (baffle effect) on the particles 2, 3 of the mixture, so that any agglomerates of multiple particles which might be present are broken up. This impact separation (baffle separation) of agglomerates before or during the buildup of electric charge on the particles due to friction on the solid body surfaces is important, because such agglomerates may of course also consist of particles of different types, which would then reach the collecting site 33 or at the collecting site 34, depending on their total charge. Then, however, in any case one would have "foreign particles" at the respective collecting sites 33 and 34.

Depending on their geometric shapes, these elevations 20 may have primarily an accelerating and/or pumping effect on the mixture and/or the air, or they may have primarily a dispersing effect on the particles of the mixture. A blocky, angular shape of these elevations 20 promotes a dispersing effect, while a paddle shape increases the acceleration or pumping effect. Elevations of different shapes may also be provided on the rotor element 13 to achieve a controlled effect.

To prevent the mixture 1, which is supplied through the product inlet 15, from traveling even a very short distance through the gap area 21 between the product inlet 15 and the product outlet 16 and thereby escaping the necessarily intense action in the first treatment area 13, 14, the product inlet 15 is situated eccentrically with respect to the rotor element 13. In addition (and not for reasons of better illustration as in FIG. 1), the product inlet 15 is situated directly behind the product outlet 16 in the direction of rotation of the rotor element 13 peripherally, so that the mixture travels at least approximately 360° on a spiral pathway in the gap area 21 between the product inlet 15 and the product outlet 16. This prevents "short-circuiting" of the pathway of the mixture between the product inlet and the product outlet.

During its path through the gap area 21, the particles 2, 3 of the mixture 1 come in intense contact with the inside surfaces 11, 12 of the housing 14 and with the surface of the rotor element 13, in particular its elevations 20 and the concave curvature of the inside surface 11 of housing 14. This leads to a specific electric charge buildup on the particles of the different types of particles 2, 3.

Because of their high velocity, the dispersed particles coming out through the product outlet 6 go approximately horizontally into the separation vessel 35, whereby the cylindrical neck area 35a of the separation vessel serves as a calming zone for the particles carrying different electric charges as they come out of the housing 14. They then settle out in the interior of the separation vessel under the influence of gravity. In the interior of the separation vessel 35, there is a first electrode 31 and a second electrode 32 opposite it. The first electrode 31 is grounded by a line 38, which contains a voltage source 37, while the second electrode 32 is grounded directly via a line 39. The differently charged particles settling out in the electric field between the two electrodes 31 and 32 travel downward on different paths, depending on their electric charge. A partition 36, which projects from the bottom area 35b of the collecting vessel 35 into the electric field between the electrodes 31, 32 subdivides the lower interior space of the separation vessel 35 into a first collecting area 33 and a second collecting area 34 in which the particles of the first type and/or the particles of the second type are collected.

In an advantageous modification of this first exemplary embodiment from FIG. 1, an air classification is also performed in the first treatment area 13, 14. To this end, air or another gas mixture is pumped through an air inlet (not shown) into the first treatment area 13, 14 and is guided within the first treatment area 13, 14 so that the fines ("flour" from endosperm residues, optionally still adhering to the aleurone particles) are separated from the coarse fraction (pure aleurone particles and pure husk particles), the fines being removed with the air stream through an air outlet (not shown) and only the coarse fraction passing through the product outlet 16 into the second treatment area 31, 32, 35.

Figure 2:
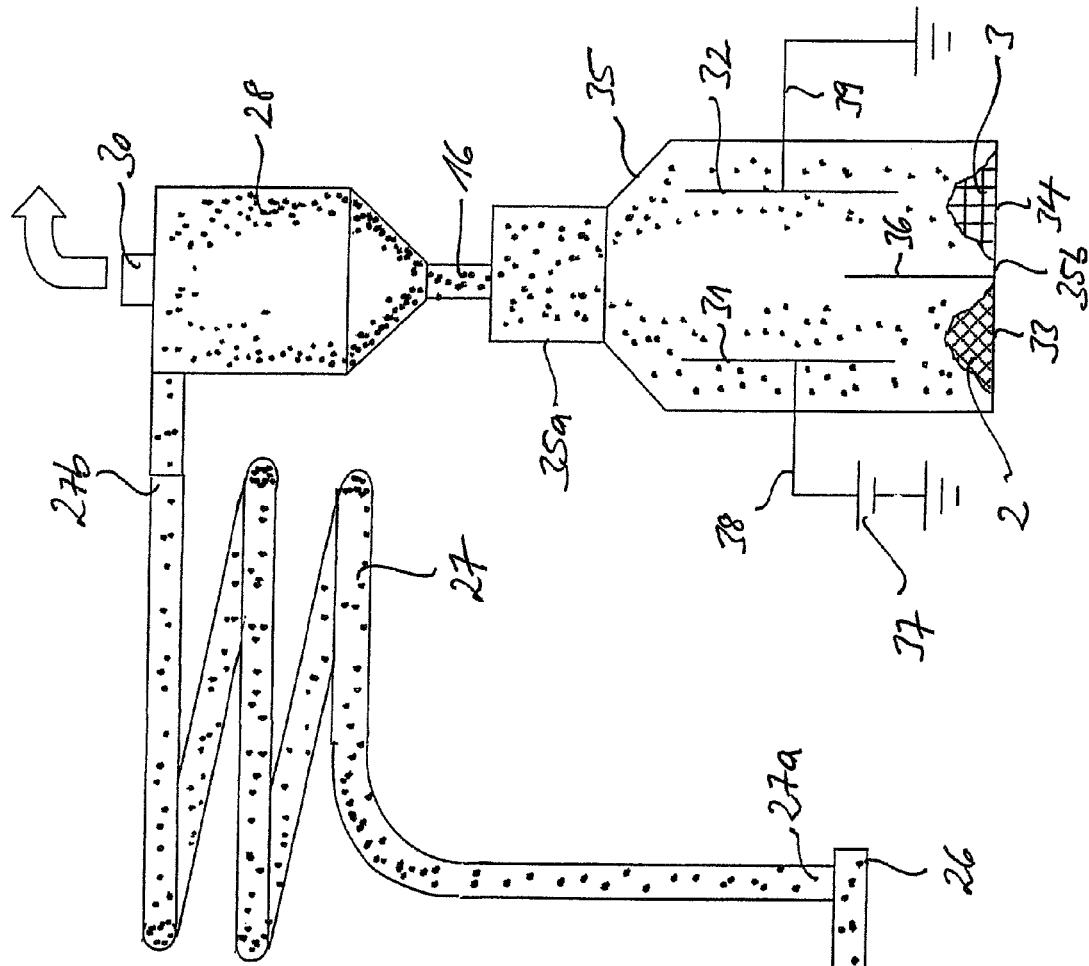
FIG. 2 shows a second exemplary embodiment of the invention.
Figure 2:
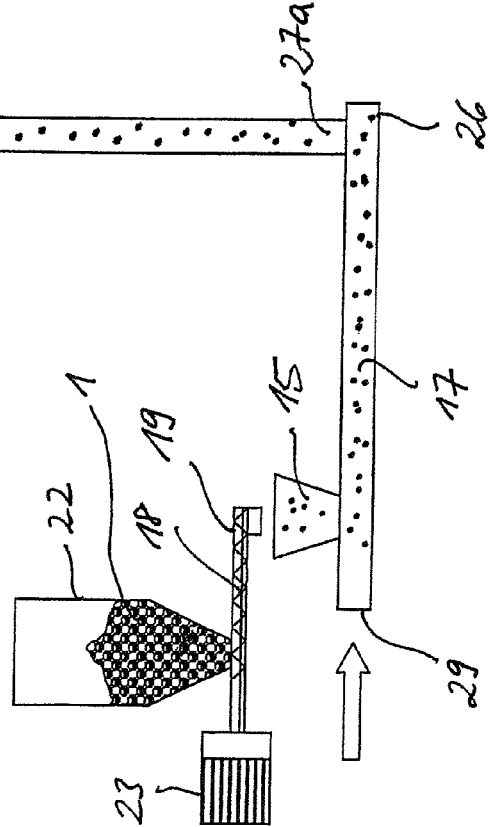

The second device according to this invention as shown in FIG. 2 differs from that shown in FIG. 1 in its first treatment area. Otherwise all the elements are identical and carry the same reference notation as those in FIG. 1. Instead of the housing 14 with the rotor element 13 which is rotatably mounted on it and can be driven by the drive motor 24, the device in FIG. 2 has a curved channel with a first end 27a and a second end 27b. The mixture 1 coming from a feed vessel 22, in particular aleurone particles and husk particles of the bran, is supplied through a product inlet 15, and a moving fluid, in particular air, is supplied through a fluid inlet 29 to a fluidization area 17 at the end of which there is a dispersion angle 26, which is connected to the first end 27a of the curved channel 27 and through which the fluidization area 17 opens into the curved channel 27. The second end 27b of the curved channel 27 opens into a product separator 28 with a fluid outlet 30 and a product outlet 16, which opens into the separation vessel 35.

The conveyor device 18, 19 transports the mixture 1 out of the feed vessel 22, through the product inlet 15 and into the fluidization area 17. A sufficient amount of fluid at a sufficient velocity is used to achieve airborne conveyance without any accumulation of particles in the interior of the curved channel 27. Due to the abrupt deflection when the particles impact on the dispersing angle 26, the above-mentioned dispersion/de-agglomeration of the particles of the mixture is accomplished. During their subsequent movement in the fluid stream and due to the friction between the particles moving along the inside surface of the curved channel 27, there is a particle type-specific buildup of electric charge on the particle types 2, 3 of mixture 1. The fluid is separated through the fluid outlet 30 in the downstream product separator 28, and the mixture of the differently charged particles according to type of particle then enters the separation vessel with its electric field.

In principle, two cases of electric charging of the particles can be differentiated:

The particles of the first type of particle are negatively (positively) charged and the particles of the second type of particle are negatively (positively) charged, but to a different extent. These particles thus differ only in the absolute value of their charge, but not in the polarity of the charge.

The particles of the first type of particle are negatively (positively) charged and the particles of the second type of particle are positively (negatively) charged. The particles thus differ in polarity and possibly also in the absolute value of their charge.

In the first case, the electrically charged particles of the first type and those of the second type repel one another, and there is practically no re-agglomeration of different particles. Separation takes place in the electric field due to different amounts of deflection in the same direction.

In the second case, the electrically charged particles of the first type and those of the second type attract one another and re-agglomeration of different particles is possible. Separation takes place in the electric field due to different amounts of deflection in opposite directions.

To prevent re-agglomeration of particles in any case before they are separated into the different types of particles in the electric field, the "particle densities" must be kept low and the "particle dwell times" must be kept short during the buildup of electric charge in the first treatment area accordingly.

In the first exemplary embodiment in FIG. 1, this is accomplished because of the selected geometry due to the cross section of the gap area, which becomes wider in the radial direction, and due to a sufficiently high rotational speed of the rotor element 13.

In the second exemplary embodiment in FIG. 2, this is accomplished by adjusting a sufficiently low product throughput/fluid throughput ratio in the fluidization area 17 and a sufficiently high fluid velocity.

In all the exemplary embodiments of the device according to this invention, the type of particle and the type of solid material on which the particles develop a triboelectric charge play a significant role whether the first case or the second case is obtained.

Thus, for example, very good charge buildup and separation results would be achieved for an aleurone particle/husk particle mixture if the solid surfaces 11 and 12, which play a crucial role in the charge buildup, are made of stainless steel.

While the foregoing description and drawings represent the present invention, it will be obvious to those skilled in the art that various changes may be made therein without departing from the true spirit and scope of the present invention.

LIST OF REFERENCE NOTATION

1 mixture of particles
2 first type of particle
3 second type of particle
11 first surface (concave)
12 additional surface
13, 14 first treatment area (first exemplary embodiment)
13 rotor element
14 housing
15 product inlet
16 product outlet
17 fluidization area
18, 19 conveyor device
18 conveyor screw
19 conveyor channel
20 elevation (baffle element, paddle element, . . . )
21 gap area
22 feed vessel
23 drive motor (for conveyor screw)
24 drive motor (for rotor element)
26 dispersing angle
27, 28 first treatment area (second exemplary embodiment)
27 curved channel
27a first end of 27
27b second end of 27
28 product separator
29 fluid inlet
30 fluid outlet
31, 32, 35 second treatment area (first or second exemplary embodiment)
31 first electrode area
32 second electrode area
33 first location/collecting area
34 second location/collecting area
35 separation vessel
35a neck area
35b bottom area
36 partition
37 voltage source
38, 39 electric lines

The invention claimed is:

1. A device for separating the various sorts of particles in a mixture comprised of particles produced by comminuting the grains of cereal grains, in particular wheat, and are present as a mixture consisting of at least a first and second sort of particle, comprising:

a) a first impact area with at least one surface of at least one solid material, along which the particles of the first particle sort and the second particle sort of the mixture can move in such a way that at least one portion of their particle surface is at least sectionally in contact with the solid material surface as they move along the at least one solid material surface, wherein the first impact area is a cyclone separator, and wherein the at least one surface of the at least one solid material is concave in the first impact area, so that the particles of the first sort and second sort that can move along the concave surface are pressed against the concave surface of the solid material as a result of their centrifugal force as they move inside the first impact area; and b) a second impact area subsequent to the first impact area, with a first electrode area and a second electrode area, between which an electrical voltage can be applied; and with a first accumulation area for particles of the first sort and an accumulation area for particles of the second sort separate from the first accumulation area, wherein the device is designed such that a coarse fraction separated in the first impact area is fed into the second impact area.

2. The device according to claim 1, wherein the first impact area is designed as a cyclone separator with a fluid inlet a fluid outlet, a product inlet and a product outlet.

3. The device according to claim 1, wherein said device has a supply area through which the mixture having particles of the first sort and particles of the second sort can be supplied to the first impact area by means of a conveying device in the supply area via the product inlet.

4. The device according to claim 1, wherein the first impact area has a curved channel with a first end and a second end, in which a product inlet and fluid inlet is connected to the first end, and a product separator with a product outlet and fluid outlet is secured to the second end for separating the product and fluid, wherein the mixture having particles of the first sort and particles of the second sort can be supplied through the product inlet, carried by a fluid stream supplied through the fluid inlet and discharged through the fluid outlet through the first impact area with the curved channel and along its concave surface, and finally routed through the product separator and its product outlet into the second impact area with the particles in their respective electrically charged state.

5. The device according to claim 4, wherein a dispersing angle against which the particles of the mixture transported through the device collide during their directional reversal is arranged upstream from the curved area of the curved channel, so that any agglomerates that might be contained in the mixture are dispersed before being transported further to the curved channel.

6. The device according to claim 1, wherein the first impact area has a non-clogging air separator or a turbo-mill.

7. The device according to claim 1, wherein, in the second impact area, the first electrode area consists of a first electrode, and the second electrode area consists of a second electrode.

8. The device according to claim 1, wherein the first electrode and second electrode in the second impact area are arranged like a plate capacitor.

9. The device according to claim 1, wherein the first electrode and second electrode in the second impact area are arranged like a cylinder capacitor.

* * * * *